US012701351B2

(12) United States Patent
Tang et al.

(10) Patent No.: US 12,701,351 B2
(45) Date of Patent: Aug. 4, 2026

(54) EARCAP STRUCTURE AND EARPHONE

(71) Applicant: GOERTEK TECHNOLOGY CO., LTD., Qingdao (CN)

(72) Inventors: Wei Tang, Qingdao (CN); Changhong Zhao, Qingdao (CN); Shuai Zhang, Qingdao (CN); Junwei Wang, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 210 days.

(21) Appl. No.: 18/626,473

(22) Filed: Apr. 4, 2024

(65) Prior Publication Data

US 2024/0251198 A1 Jul. 25, 2024

Related U.S. Application Data

(63) Continuation of application No. PCT/CN2022/102555, filed on Jun. 29, 2022.

(30) Foreign Application Priority Data

Nov. 30, 2021 (CN) ......................... 202122995075.6

(51) Int. Cl.
*H04R 1/10* (2026.01)

(52) U.S. Cl.
CPC ......... *H04R 1/1091* (2013.01); *H04R 1/1016* (2013.01); *H04R 1/1058* (2013.01)

(58) Field of Classification Search
CPC ...... H04R 1/10; H04R 1/1016; H04R 25/652; H04R 25/656; H04R 25/659; H04R 2225/77
See application file for complete search history.

(56) References Cited

U.S. PATENT DOCUMENTS

| | | | | |
|---|---|---|---|---|
| 4,006,796 A * | 2/1977 | Coehorst | H04R 25/656 128/865 |
| 6,513,621 B1 * | 2/2003 | Deslauriers | H04R 1/1016 128/865 |
| 7,403,629 B1 * | 7/2008 | Aceti | H04R 25/656 381/322 |
| 8,340,310 B2 * | 12/2012 | Ambrose | H04R 1/1091 381/328 |

(Continued)

FOREIGN PATENT DOCUMENTS

| | | |
|---|---|---|
| CN | 201797582 U | 4/2011 |
| CN | 205545822 U | 8/2016 |

(Continued)

OTHER PUBLICATIONS

International Search Report and Written Opinion in Corresponding International Application No. PCT/CN2022/102555, mailed Sep. 15, 2022; 15 pgs.

*Primary Examiner* — Ryan Robinson
(74) *Attorney, Agent, or Firm* — HAUPTMAN HAM, LLP

(57) ABSTRACT

Disclosed are an earcap structure and an earphone. The earcap structure includes an earcap body provided with an installation channel, the installation channel is sleeved on an outside of an in-ear body of an earphone, a cavity is provided in a wall of the installation channel, and the cavity is filled with a fluid filler to make the cavity squeezed and deformed in response to that an outside of the earcap body is in contact with a concha cavity.

9 Claims, 4 Drawing Sheets

(56) References Cited

U.S. PATENT DOCUMENTS

| | | | | |
|---|---|---|---|---|
| 10,418,016 | B2 * | 9/2019 | Goldstein | A61F 11/10 |
| 11,496,823 | B2 * | 11/2022 | Mizoe | H04R 1/1016 |
| 2004/0066939 | A1 * | 4/2004 | Wong | A61B 7/02 381/328 |
| 2007/0116319 | A1 * | 5/2007 | Hagberg | H04R 1/1016 381/328 |
| 2015/0038774 | A1 * | 2/2015 | Poulsen | H04R 25/652 600/25 |
| 2019/0208302 | A1 * | 7/2019 | Monti | H04R 25/656 |

FOREIGN PATENT DOCUMENTS

| | | | | | |
|---|---|---|---|---|---|
| CN | 107925810 | A | | 4/2018 | |
| CN | 113115163 | A | * | 7/2021 | H04R 1/1058 |
| CN | 214851757 | U | | 11/2021 | |
| CN | 216490980 | U | | 5/2022 | |
| DE | 2737252 | A | * | 3/1978 | |
| DE | 4339899 | C2 | * | 4/1998 | H04R 25/656 |
| WO | WO-2023276500 | A1 | * | 1/2023 | H04R 25/00 |

* cited by examiner

EARCAP STRUCTURE AND EARPHONE

CROSS-REFERENCE TO RELATED APPLICATIONS

The present application is a continuation application of International Application No. PCT/CN2022/102555, filed on Jun. 29, 2022, which claims priority to Chinese Patent Application No. 202122995075.6, filed on Nov. 30, 2021. The disclosures of the above-mentioned applications are incorporated herein by reference in their entireties.

TECHNICAL FIELD

The present application relates to the technical field of earphones, and in particular, to an earcap structure and an earphone.

BACKGROUND

With the popularity of earphones, more and more people are using earphones. Since everyone's ear shape is different, in particular, the shape of the concha cavity varies greatly, it's hard for the earphones on the market with a fixed shape to meet everyone's wearing requirements.

SUMMARY

The main purpose of the present application is provide an earcap structure and an earphone, which aims to solve the problem that current earphones have poor fit to human ears and cannot meet everyone's wearing requirements.

In order to achieve the above purpose, the present application provides an earcap structure, including an earcap body. The earcap body is provided with an installation channel, the installation channel is sleeved on an outside of an in-ear body of an earphone, a cavity is provided in a wall of the installation channel, and the cavity is filled with a fluid filler to make the cavity squeezed and deformed in response to that an outside of the earcap body is in contact with a concha cavity.

In some embodiments, the filler is gel, liquid or gas; and/or the earcap body is made of soft rubber.

In some embodiments, the cavity is provided in an annular shape and configured to surround a periphery of the installation channel; or a plurality of cavities are provided and each of the cavities is provided in a strip shape, and the plurality of cavities are spaced apart along a circumference of the installation channel.

In some embodiments, the installation channel is provided with a sound output end corresponding to a sound output port of the earphone, L1 represents a distance between one end of the cavity facing the sound output end and the sound output end, and L2 represents a distance between the other end of the cavity and a side end of the installation channel away from the sound output end, where L1>L2.

The installation channel is provided with a sound output end corresponding to a sound output port of the earphone, and a side end of the cavity away from the sound output end extends to an end of the installation channel away from the sound output end.

In some embodiments, the earcap body includes:

an inner layer of an earcap provided in a cylindrical shape, an inner hole of the inner layer of the earcap is configured to form the installation channel; and an outer layer of the earcap provided in a cylindrical shape and sleeved on an outside of the inner layer of the earcap, two ends of the outer layer of the earcap are correspondingly connected to two ends of the inner layer of the earcap to form the cavity between the inner layer and the outer layer.

In some embodiments, one end of the inner layer of the earcap is integrally connected to a corresponding end of the outer layer of the earcap, and the other end of the inner layer of the earcap is connected to a corresponding end of the outer layer of the earcap through hot pressing.

In some embodiments, the installation channel is provided with a sound output end corresponding to a sound output port of the earphone; and in a direction approaching the sound output end, a size of the cavity in a wall thickness direction of the installation channel is configured to gradually increase.

The present application further provides an earphone including: a shell provided with an in-ear body protruding toward one side, an end of the in-ear body is provided with a sound output port; and the above-mentioned earcap structure, an installation channel of the earcap structure is sleeved on an outside the in-ear body.

In some embodiments, an outer diameter of the in-ear body is configured to first increase and then decrease in a direction away from the shell; and/or an end of the earphone structure away from the shell is configured to protrude from the sound output port.

In some embodiments, a limiting structure is provided between the in-ear body and the earcap structure, the limiting structure includes a convex part and a concave part, the convex part is snap-fitted to the convex part, one of the convex part and the concave part is provided on an outer surface of the in-ear body, and the other is provided on an inner wall of the installation channel.

In the technical solution of the present application, when in use, the part of the earcap body is in contact with the concha cavity of the human ear. Because the cavity of the earcap body is filled with a fluid filler, when it is squeezed from the outside, the filler will deform, causing the shape of the cavity to deform. The shape of the cavity changes along with the concha cavity, such that the earcap is capable of adapting to different ear shapes. The deformable cavity also allows the in-ear body to tightly contact the human ear, thereby improving the sealing between the earphone and human ears, firmness of wearing, and the comfort of wearing, thus meeting the requirements of different people. Therefore, the earphone can match a wider range of human ears.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that if there are directional indications involved in the embodiments of the present application, the directional indications are only used to explain the relative positional relationship, movement, etc. between the components in a specific posture. If the specific posture changes, the directional indications will also change accordingly.

In addition, if there are descriptions involving "first", "second", etc. in the embodiments of the present application, the descriptions of "first", "second", etc. are only for descriptive purposes and shall not be understood as indications or implications of relative importance or implicit indication of the number of technical features indicated. Therefore, features defined as "first" and "second" may explicitly or implicitly include at least one of these features. In addition, the technical solutions in various embodiments can be combined with each other, but it must be based on the realization by those skilled in the art. When the combination of technical solutions is contradictory or cannot be realized, it should be considered that such a combination of technical solutions does not exist, and is not within the scope of the present application.

With the popularity of earphones, more and more people are using earphones. Since the shape of each person's ears is very different, especially the shape of the concha cavity, the earphones on the market with a fixed shape cannot adapt to everyone's wearing requirements. Especially for in-ear earphones, common in-ear earphones on the market generally fit with the human ear through a soft earcap. However, the earcaps are hard in texture and have poor matching effect with the human ear. For some people with specially shaped concha cavity, the earcaps cannot fit well and are easy to automatically fall off during wearing. The earcaps also put a heavy burden on the ears and have poor comfort. When the earcaps are used for Bluetooth earphones, they may cause the earphones to fall and become lost.

Figure 1:
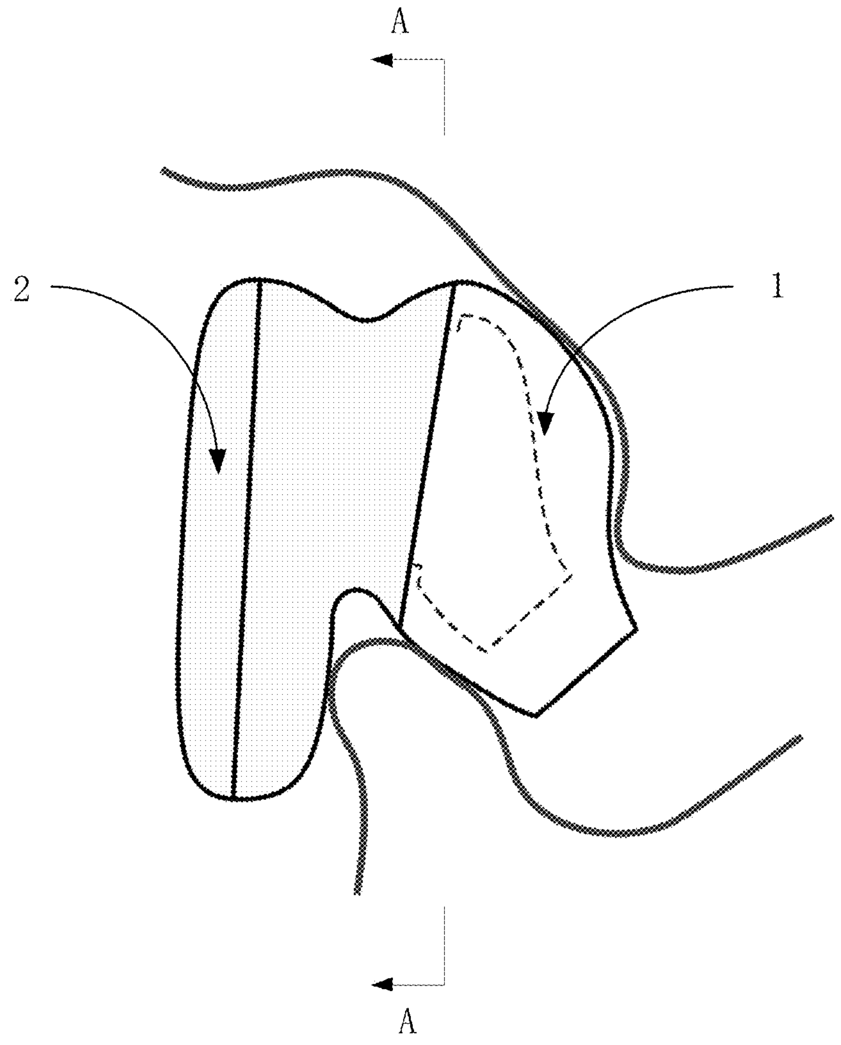
FIG. 1 is a schematic view of an earphone engaged with a human ear according to some embodiments of the present application.
Figure 2:
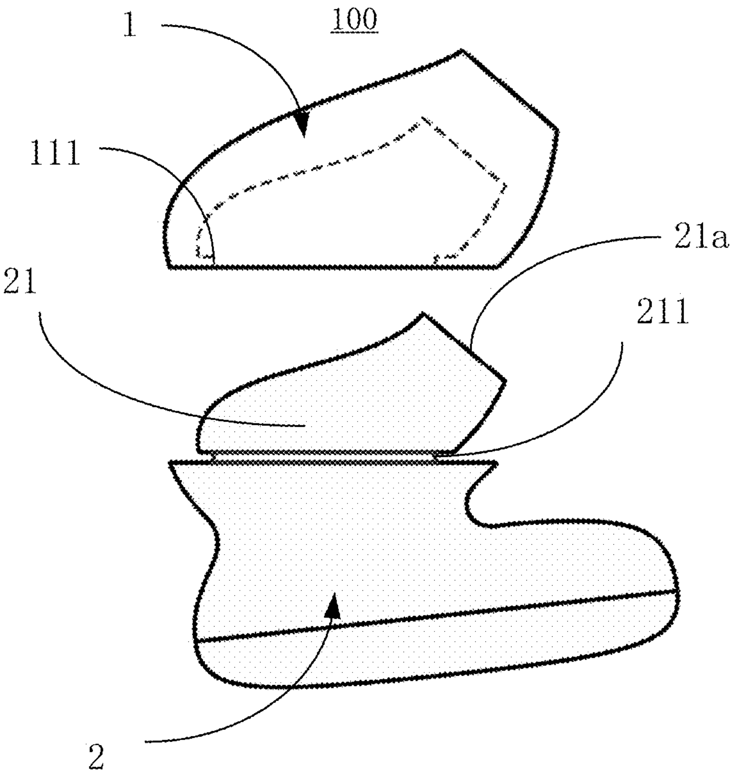
FIG. 2 is a exploded schematic view of the earphone in FIG. 1.
Figure 3:
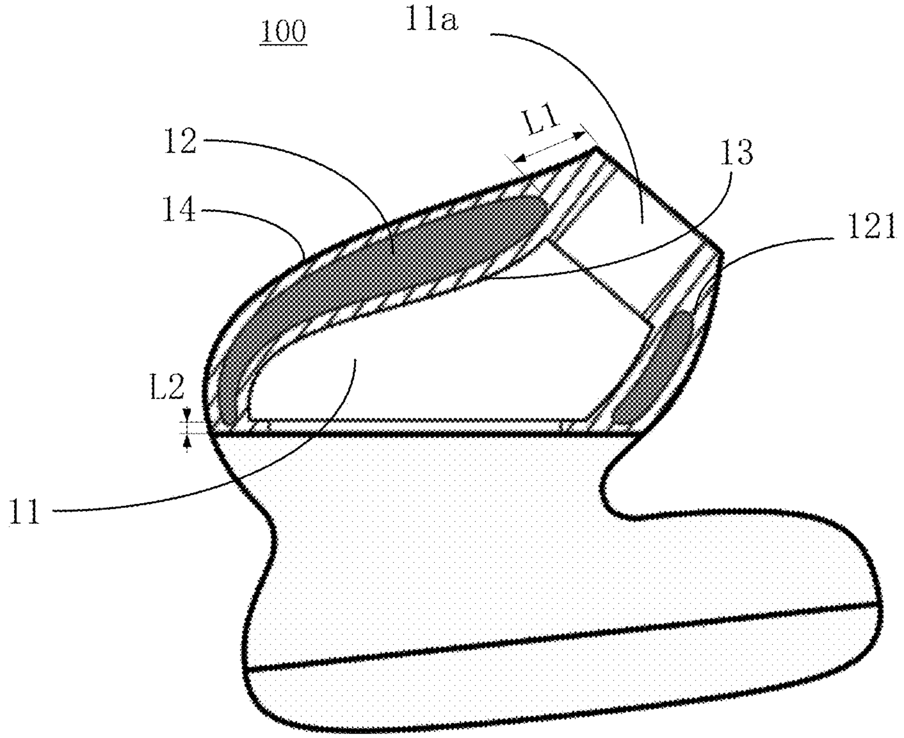
FIG. 3 is a schematic cross-sectional view of the earphone along a direction of A-A in FIG. 1.
Figure 4:
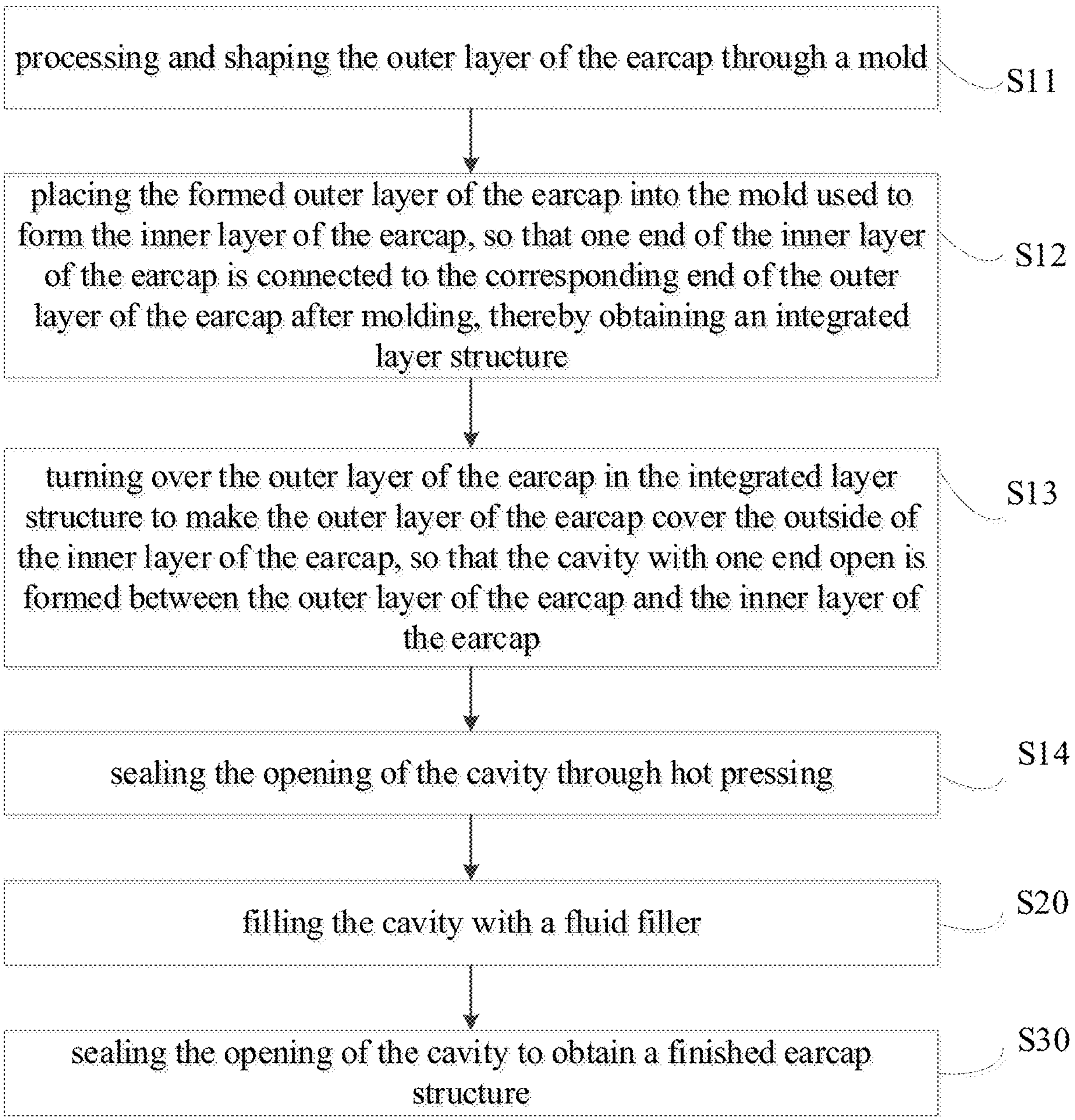
FIG. 4 is a schematic flow chart of a method for processing an earcap structure according to some embodiments of the present application.

FIG. 1 to FIG. 3 are schematic views of embodiments of earphones provided by the present application. FIG. 4 shows schematic flow chart of a method for processing an earcap structure according to some embodiments of the present application.

As shown in FIG. 1 to FIG. 2, an earphone 100 provided by the present application, includes a shell 2 and an earcap structure 1. The shell 2 is formed with an in-ear body 21 protruding toward one side. The end of the in-ear body 21 is provided with a sound output port 21*a*, and the installation channel 11 of the earcap structure 1 is provided outside the in-ear body 21. The earcap structure 1 is matched with the human ear. The earcap structure 1 is provided to adapt to different ear shapes. It should be noted that the present application does not limit the specific form of the earphone 100, which may be a wired earphone or a wireless earphone. The following description takes wireless earphones as an example.

In some embodiments, the earcap structure 1 includes an earcap body. The earcap body has an installation channel 11. The installation channel 11 is provided on the outside of the in-ear body 21 of the earphone 100. A cavity 12 is provided in the wall of the installation channel 11, and the cavity 12 is filled with a fluid filler, which allows the cavity 12 to be squeezed and deformed when the outside of the earcap body contacts the concha cavity.

In the technical solution of the present application, when in use, the part of the earcap body is in contact with the concha cavity of the human ear. Because the cavity 12 of the earcap body is filled with a fluid filler, when it is squeezed from the outside, the filler will deform, causing the shape of the cavity 12 to deform. The shape of the cavity 12 changes along with the concha cavity, such that the earcap is capable of adapting to different ear shapes. The deformable cavity 12 also allows the in-ear body 21 to tightly contact the human ear, thereby improving the sealing between the earphone and human ears, firmness of wearing, and the comfort of wearing, thus meeting the requirements of different people. Therefore, the earphone can match a wider range of human ears.

The present application does not limit the specific material of the filler, but the filler does not cause any harm to the human body, and the flow performance of the filler meets the deformation requirements. In some embodiments, the filler can be gel, liquid or gas. In some embodiments, the cavity 12 can be filled with air. It is necessary to ensure the airtightness of the cavity 12 when filling with air to prevent air leakage, so that the cavity 12 can be squeezed and deformed successfully. In other embodiments, the filler is gel, which is a material between solid and liquid and has good fluidity. When the earphone 100 is worn, the squeezing force provided by the ear is transmitted to the soft gel and the gel deforms with the shape of the concha cavity to adapt to the shape of the ear.

In order to ensure the support and softness of the earcap body, the material of the earcap body in the present application is soft glue. The soft glue described in the present application is a solid glue material with a soft texture and a certain elasticity. In these embodiments, the material of the earcap body is silica gel which can have a stable appearance while meeting certain softness requirements. In these embodiments, the silica gel is used to process the earcap body. The cavity 12 is filled with silicone gel, which is a softer material than silica gel, so that the earcap body adopts a combination of silica gel and comfortable and soft silicone gel to satisfy more people with different shapes of the concha cavity, which not only ensures the firmness of wearing, but also ensures the comfort and sealing.

Furthermore, the present application does not limit the shape of the cavity 12. In some embodiments, as shown in FIG. 3, the cavity 12 is provided in an annular shape, surrounding the periphery of the installation channel 11, so that the the cavity 12 has a larger volume and a greater amount of deformation, and can adaptively fit to the circumference regardless of the shape of the concha cavity. In addition, the annular cavity 12 is easier to process.

In other embodiments, the cavity 12 is provided in a strip shape and there are a plurality of cavities 12, and the plurality of cavities 12 are spaced apart along the circumference of the installation channel 11. This arrangement saves filling material, avoids waste, and makes the cavities 12 have a longer service life. Even if one of the cavities 12 breaks, the other cavities 12 can still meet the use requirements.

The sound output port 21*a* needs to extend into the human ear during use, and the end of the earcap body corresponding to the sound output port 21*a* also needs to extend into the human ear. In some embodiments, the installation channel 11 is provided with the sound output end 11*a* corresponding to the sound output port 21*a* of the earphone 100. L1 represents the distance between the end of the cavity 12 facing the sound output end 11*a* and the sound output end 11*a*, and L2 represents the distance between the other end of the cavity 12 and the side end of the installation channel 11 away from the sound output end 11*a*, where L1>L2, thereby forming a solid segment between the cavity 12 and the sound output end 11*a*. The solid segment covers the outside of the sound output port 21*a*. When designing the earcap body, considering that the deformation of the solid segment is small, no cavity 12 and filler are provided in the solid segment as long as the seal between this part and the ear canal is ensured. Since the thickness here is small, it is easy to wear, does not produce pressure on the ear canal, and improves comfort. In order to provide a larger deformation space for the cavity 12 in a limited space, the side end of the cavity 12 away from the sound output end 11*a* extends to the end of the installation channel 11 away from the sound output end 11*a*. The position of the in-ear body 21 away from the sound output port 21*a* is generally exposed to the outside of the human ear. Extending the cavity 12 to this position will not affect the wearing of the earphone 100, and can also provide the cavity 12 with the maximum amount of deformation.

It should be noted that the above two associated technical features can be provided at the same time, or can be provided selectively. In these embodiments, they are provided at the same time, so that a solid segment is formed between the first side end 121 and the sound output end 11*a*, and at the same time, the side of the cavity 12 away from the first side end 121 extends to the end of the in-ear body 21 close to the shell 2, which not only maximizes the deformation of the cavity 12, but also facilitates in-ear wearing.

In order to process the cavity 12, the earcap body can be processed first, and then cut on one side to process the cavity 12, and then the cut is heat-pressed and sealed. However, considering that the material of the earcap body is relatively soft and the size is small, it is difficult to cut and process, and the yield is low. In some embodiments of the present application, the earcap body includes an inner layer of the earcap 13 and an outer layer of the earcap 14. The inner layer of the earcap 13 and the outer layer of the earcap 14 are provided in a cylindrical shape. The inner hole of the inner layer of the earcap 13 forms the installation channel 11. The outer layer of the earcap 14 is provided on the outside of the inner layer of the earcap 13, used to contact the human ear. The inner side of the inner layer of the earcap 13 and the outer side of the outer layer of the earcap 14 respectively serve as the inner wall surface and the outer surface of the earcap body, and the end of the outer layer of the earcap 14 is connected to the corresponding end of the inner layer of the earcap 13 to form the cavity 12 in the middle of the two. That is to say, the earcap body is divided into an inner layer and an outer layer, and the two layers processed in stages to ensure the processing quality of the product, improve the pass rate, and also easily control the volume of the cavity 12.

In some embodiments, the inner layer of the earcap 13 and the outer layer of the earcap 14 are processed separately, and then the two ends are hot pressed in sequence. In other embodiments, one end of the inner layer of the earcap 13 and the corresponding end of the outer layer of the earcap 14 are integrally connected, and the other end of the inner layer of the earcap 13 is connected to the corresponding end of the outer layer of the earcap 14 through hot pressing. In this way, the inner layer of the earcap 13 and the outer layer of the earcap 14 can be integrally formed after preliminary processing, and then the outer layer of the earcap 14 is turned over to cover the inner layer of the earcap 13. By processing in this way, a fully connected earcap body can be directly obtained. After the cavity 12 is filled, the other end is sealed by hot pressing, which reduces the number of processing steps and improves processing efficiency.

Furthermore, the installation channel 11 has a sound output end 11*a* corresponding to the sound output port 21*a* of the earphone 100. In a direction approaching the sound output end 11*a* of the installation channel 11, a size of the cavity 12 in a wall thickness direction of the installation channel 11 is configured to gradually increase. In the natural state, the outer diameter of the cavity 12 at the position close to the sound output end 11*a* is larger. This position is in contact with the concha cavity. When in use, this position is squeezed to cause the internal filler to flow towards the other side to ensure its initial outer diameter to adapt to a larger range of concha cavity structure.

In some embodiments of the present application, the outer diameter of the in-ear body 21 first increases and then decreases in the direction away from the shell 2. After the earcap structure 1 is installed, the inner wall of the installation channel 11 is in close contact, thereby ensuring that the earcap structure 1 is tightly connected and not easy to fall off, and is also easy to wear.

The in-ear body 21 is made of a hard material and has low comfort in direct contact with the human ear. Therefore, in some embodiments of the present application, the end of the earcap structure 1 away from the shell 2 is configured to protrude from the sound output port 21*a* to ensure that the part of the in-ear body 21 that fits the human ear is entirely covered by the earcap structure 1, thus ensuring the user's wearing experience. Corresponding to the above-mentioned embodiments, the solid segment is provided to protrude from the sound output port 21*a*.

In order to further improve the connection between the earcap structure 1 and the in-ear body 21, a limiting structure is provided between the in-ear body 21 and the earcap structure 1. The limiting structure includes a convex part and a concave part, the convex part is snap-fitted to the convex part, one of the convex part and the concave part is provided on an outer surface of the in-ear body, and the other is provided on the inner wall of the installation channel to fix the in-ear body 21 and the earcap structure 1. At the same time, it is convenient for quick disassembly and assembly. The present application does not limit the specific structural forms of the convex part and the concave part. It can be a local point contact engagement between a plurality of convex blocks and a plurality of grooves, or it can be a snap connection between a strip-shaped convex block and a strip-shaped groove. In the present application, an annular groove 211 is provided on the outer surface of the end of the in-ear body 21 close to the shell 2 as the concave part, and the inner wall of the installation channel 11 is provided with the annular protrusion 111 as the convex part. The annular protrusion 111 is clamped into the annular groove 211. When the earcap body is fixed to the in-ear body 21, the annular protrusion 111 and the annular groove 211 engage with each other to play a fixing role and prevent the earcap body from falling off. When the user applies force in the direction from the shell 2 to the sound output port 21*a*, the earcap body is deformed by force and falls off from the in-ear body 21, and vice versa for installation. The mechanism is simple and easy to install. During processing, the annular protrusion 111 can be integrally formed with the earcap body.

The following is a processing method for processing the above-mentioned earcap structure 1. In some embodiments, the processing method includes the following steps:

S10, processing a earcap body through a mold;

It should be noted that the molded earcap body has an installation channel 11, which is sleeved on the outside of the in-ear body 21 of the earphone 100, and a cavity 12 is provided in the wall of the installation channel 11. In some embodiments, the material of the earcap body is soft rubber. The soft rubber described in the present application is a solid glue material with a soft texture and a certain elasticity. In some embodiments, the material of the earcap body is silica gel.

S20, filling the cavity 12 with a fluid filler;

It should be noted that the filler can be injected directly before the cavity 12 is sealed, or it can be injected through a pinhole after both ends of the cavity 12 are sealed. It is necessary to ensure exhaust during the filling process to prevent air bubbles from appearing during filling. When the filling material is air, there is no need to consider this issue.

S30, sealing the opening of the cavity 12 to obtain a finished earcap structure.

By processing the earcap structure 1 in this way, the cavity 12 is in a sealed state and is filled with fillers. The earcap body is made of silica gel and can be thermally solidified through a dedicated mold.

Furthermore, in the processing method of the earcap body in step S10, the earcap body can be processed into an integral structure through a mold. However, considering that the mold corresponding to the cavity 12 is not easy to design and the product is easily damaged when processed alone, therefore, in some embodiments, the earcap body includes an inner layer of the earcap 13 and an outer layer of the earcap 14. Based on these embodiments, step S10 includes:

S11, processing and shaping the outer layer of the earcap 14 through a mold;

S12, placing the formed outer layer of the earcap 14 into the mold used to form the inner layer of the earcap 13, so that one end of the inner layer of the earcap 13 is connected to the corresponding end of the outer layer of the earcap 14 after molding, thereby obtaining an integrated layer structure;

S13, turning over the outer layer of the earcap 14 in the integrated layer structure to make the outer layer of the earcap 14 cover the outside of the inner layer of the earcap 13, so that the cavity 12 with one end open is formed between the outer layer of the earcap 14 and the inner layer of the earcap 13.

It should be noted that after the outer layer of the earcap 14 is turned over, the inner hole of the inner layer of the earcap 13 forms the installation channel 11.

S14, sealing the opening of the cavity 12 through hot pressing.

That is to say, the earcap body is processed twice through two different molds to facilitate the control of the processing accuracy of the product. After the processing is completed, the outer layer of the earcap 14 is turned over to naturally obtain the cavity 12, which is easy to operate and ensures the flatness of each surface.

In these embodiments, in step S20, after the end of the cavity 12 is hot-pressed and sealed, a glue injection port and an exhaust port are formed at the inner wall of the sealed opening, and then the filler is injected into the cavity 12. If the filler is a gel product, the entire product after the cavity 12 is filled needs to be heated and vulcanized in the oven to achieve the tight fit between the parts and ensure the sealing. Since the opening of the injection method is very small, after the injection needle is pulled out, the material itself can be automatically sealed, and it is easier to seal the pinhole at this time. If the cavity 12 with an opening is filled directly, it is not easy to position, and if the filler is air, it is not easy to ensure the volume of the filler.

It should be noted that the present application does not limit the processing order of the inner layer 13 of the earcap and the outer layer 14 of the earcap. The inner layer 13 of the earcap can also be processed first, and then the outer layer 14 of the earcap can be processed.

The above are only some of the embodiments of the present application, and are not intended to limit the patent scope of the present application. Under the concept of the present application, any equivalent structural transformation made using the contents of the description and drawings of the present application, directly or indirectly applied in other related technical fields, are included in the scope of the present application.

What is claimed is:

1. An earcap structure, comprising an earcap body, wherein the earcap body is provided with an installation channel, the installation channel is sleeved on an outside of an in-ear body of an earphone, a cavity is provided in a wall of the installation channel, and the cavity is filled with a fluid filler to make the cavity squeezed and deformed in response to that an outside of the earcap body is in contact with a concha cavity; and the installation channel is provided with a sound output end corresponding to a sound output port of the earphone, L1 represents a distance between one end of the cavity facing the sound output end and the sound output end, and L2 represents a distance between the other end of the cavity and a side end of the installation channel away from the sound output end, where L1>L2.

2. The earcap structure of claim 1, wherein the filler is gel, liquid or gas; and/or the earcap body is made of soft rubber.

3. The earcap structure of claim 1, wherein the cavity is provided in an annular shape and configured to surround a periphery of the installation channel; or a plurality of cavities is provided and each of the cavities is provided in a strip shape, and the plurality of cavities are spaced apart along a circumference of the installation channel.

4. The earcap structure of claim 1, wherein the earcap body comprises:

an inner layer of an earcap provided in a cylindrical shape, wherein an inner hole of the inner layer of the earcap is configured to form the installation channel; and an outer layer of the earcap provided in a cylindrical shape and sleeved on an outside of the inner layer of the earcap, wherein two ends of the outer layer of the earcap are correspondingly connected to two ends of the inner layer of the earcap to form the cavity between the inner layer and the outer layer.

5. The earcap structure of claim 4, wherein one end of the inner layer of the earcap is integrally connected to a corresponding end of the outer layer of the earcap, and the other end of the inner layer of the earcap is connected to a corresponding end of the outer layer of the earcap through hot pressing.

6. The earcap structure of claim 1, wherein the installation channel is provided with a sound output end corresponding to a sound output port of the earphone; and in a direction approaching the sound output end, a size of the cavity in a wall thickness direction of the installation channel is configured to gradually increase.

7. An earphone, comprising:

a shell provided with an in-ear body protruding toward one side, an end of the in-ear body being provided with a sound output port; and the earcap structure of claim 1, wherein an installation channel of the earcap structure is sleeved on an outside the in-ear body.

8. The earphone of claim 7, wherein an outer diameter of the in-ear body is configured to first increase and then decrease in a direction away from the shell; and/or an end of the earphone structure away from the shell is configured to protrude from the sound output port.

9. The earphone of claim 7, wherein a limiting structure is provided between the in-ear body and the earcap structure, the limiting structure comprises a convex part and a concave part, the convex part is snap-fitted to the concave part, one of the convex part and the concave part is provided on an outer surface of the in-ear body, and the other is provided on an inner wall of the installation channel.

* * * * *